United States Patent [19]

Troccaz

[11] Patent Number: 5,529,159
[45] Date of Patent: Jun. 25, 1996

[54] DISENGAGEABLE FREE WHEEL

[75] Inventor: Jocelyne Troccaz, Eybens, France

[73] Assignee: Université Joseph Fourier, Grenoble Cedex, France

[21] Appl. No.: 339,247

[22] Filed: Nov. 10, 1994

[30] Foreign Application Priority Data

Nov. 19, 1993 [FR] France .................... 93 14200

[51] Int. Cl.$^6$ ............................................. F16D 41/06
[52] U.S. Cl. ........................ 192/41 R; 192/42; 192/45; 192/48.92; 192/21; 477/6; 901/25
[58] Field of Search ......................... 192/41 R, 42, 192/45, 48.2, 48.92, 20, 21; 477/5, 6, 8; 901/23, 25, 38

[56] References Cited

U.S. PATENT DOCUMENTS

| | | | |
|---|---|---|---|
| 1,268,350 | 6/1918 | Henry | 192/20 X |
| 1,946,177 | 2/1934 | Neurath | 192/48.92 |
| 2,519,026 | 8/1950 | Cuttat | 192/21 X |
| 2,959,974 | 11/1960 | Emrick | 192/21 X |
| 3,392,811 | 7/1968 | Heisler | 192/20 |
| 3,666,063 | 5/1972 | Schoemann et al. | 192/21 |
| 3,801,990 | 4/1974 | Helfet . | |
| 3,921,765 | 11/1975 | Swander, Jr. . | |
| 4,187,936 | 2/1980 | Davenport | 192/21 |
| 4,284,183 | 8/1981 | Brisabois et al. | 192/48.92 |
| 4,651,591 | 3/1987 | Wurst | 901/23 X |
| 4,693,351 | 9/1987 | Adolfsson | 192/51 X |
| 4,944,375 | 7/1990 | Ohta et al. | 192/20 X |
| 5,211,273 | 5/1993 | Castens | 192/45 |
| 5,271,486 | 12/1993 | Okamoto et al. | 192/45 |
| 5,355,743 | 10/1994 | Tesar | 901/23 X |
| 5,399,951 | 3/1995 | Lavallee et al. . | |

FOREIGN PATENT DOCUMENTS 2251997  11/1973  France .
8913924  1/1990  Germany .

*Primary Examiner*—Andrea L. Pitts
*Attorney, Agent, or Firm*—Lowe, Price, LeBlanc & Becker

[57] ABSTRACT

A disengageable free wheel includes a shaft and a ring which can rotate only in a free direction with respect to the shaft. The free wheel includes a motor for rotating the shaft in its free direction, whereby the ring can rotate at most as fast as the shaft in the direction opposite to its free direction.

6 Claims, 2 Drawing Sheets

DISENGAGEABLE FREE WHEEL

BACKGROUND OF THE INVENTION

1. Field of the Invention

The present invention relates to a free wheel, that is, an element which couples two mechanical parts so that the two parts can have a relative rotation in only one direction.

The present invention more particularly concerns a disengageable free wheel allowing, depending on the active or inactive state of a control signal, two parts to rotate one with respect to the other, either in two directions, or only in the one direction determined by the free wheel, hereinafter the "free" direction.

2. Discussion of the Related Art

A particularly interesting application of a disengageable free wheel is described in French patent application 2,691,093 (filed on May 12, 1992) relating to a surgical robot for guiding movements. In such a robot, each articulation must be blockable, capable of freely rotating in two directions, or capable of retating only in a selected one of the two directions. These four possible states of the articulation are determined by logic control signals. To obtain these four articulation states, two coaxial disengageable free wheels, with opposite free directions, are used.

FIG. 1 represents a conventional free wheel 8. The free wheel 8 includes an internal shaft 10 surrounded by an external ring 12. The inner wall of ring 12 includes a plurality of ramps 13 oriented in a same direction. In FIG. 1, each ramp begins at a position near shaft 10 and departs therefrom clockwise. A roller 14 is associated with each ramp. The diameter of roller 14 is slightly smaller than the distance separating the periphery of shaft 10 from the most distant portion of the ramp. Moreover, as represented in FIG. 1, the top 13-1 of each ramp is rounded to match the associated roller 14.

The operation of this free wheel is as follows. Assume that shaft 10 is fixed. When ring 12 is rotated clockwise, the ramps 13 start to roll on rollers 14 like in a ball bearing. Almost immediately, depending on the clearance about rollers 14, the diameter of roller 14 becomes smaller than the gap separating the periphery of shaft 10 from ramps 13. Rollers 14 then block and prevent ring 12 from continuing to rotate clockwise. The free wheel blocks rapidly so that the clockwise rotation (in the non-free direction) of ring 12 is negligible.

In contrast, when ring 12 is rotated counterclockwise (as indicated by an arrow S in FIG. 1), rollers 14 are urged back to the top of ramps 13 where they can freely rotate.

Of course, other types of free wheels are available, for example ratchet free wheels. However, the drawback of such ratchet free wheels is to allow a slight rotation in the non-free direction before they block.

A conventional solution to manufacture a disengageable free wheel consists in providing a clutch for coupling or uncoupling, for example, shaft 10 of the free wheel with a part whose rotation should be controlled with respect to ring 12. If the shaft is uncoupled, the part can rotate in any direction with respect to ring 12. If the shaft is coupled, the part can rotate in the free direction only.

Such a clutch device always has some clearance between the coupled and uncoupled positions, which causes high response delay time and noisy operation. A high response delay time when coupling (blocking) is hazardous for a surgical robot. When an articulation of the robot reaches a limit angular position, it must be stopped (by coupling it with a corresponding free wheel). If the coupling response delay time is long, the limit may be exceeded before the articulation is stopped.

Moreover, the blocking of the articulation must be immediate to ensure satisfactory accuracy. It is difficult to provide slowing down the articulation by friction effect; indeed, this would cause an inaccurate final position depending on the energy provided to the articulation.

SUMMARY OF THE INVENTION

An object of the present invention is to provide a disengageable free wheel with a very short response delay time.

Another object of the present invention is to provide such a disengageable free wheel which also limits the rotation speed in the direction opposite to the free direction.

A further object of the present invention is to provide such a disengageable free wheel allowing a gradual rotation stop.

To achieve these objects, the present invention provides a disengageable free wheel including first and second parts, rotable the one relative to the other only in a free direction. A motor is provided for rotating the first part in its free direction, whereby the second part can rotate at most as fast as the first part in the direction opposite to the free direction.

According to an embodiment of the present invention, the second part is a ring and the first part is a central shaft on which the ring is blockable in rotation by a ramp and roller system.

According to an embodiment of the present invention, the first part is rotated by a worm gear.

The present invention is also directed to providing an articulation including two free wheels of the above mentioned type, i.e., coaxial free wheels with opposite free directions. The second parts of the free wheels are integral with a first element of the articulation and the motors are integral with a second element of the articulation.

The foregoing and other objects, features, aspects and advantages of the invention will become apparent from the following detailed description of the present invention when taken in conjunction with the accompanying drawings.

DETAILED DESCRIPTION

Figure 1:
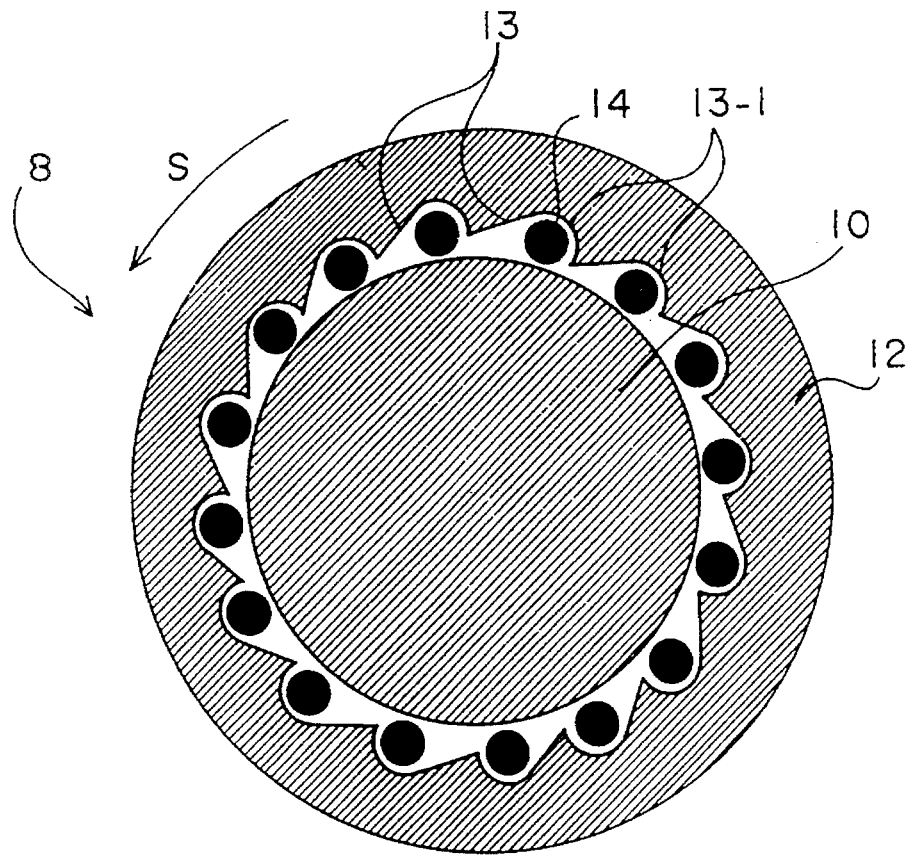
FIG. 1, above described, represents a conventional non-disengageable free wheel.

For disengaging a free wheel such as that of FIG. 1, the present invention provides for rotating either shaft 10 or ring 12 in its free direction. Thus, regardless of the rotation speed of the driven part (10 or 12), the other part is not rotated. This achieves a reliable device when used in a surgical robot which should never have any uncontrolled movement caused by a defective control of an activator (motor). In the examples described hereinafter, it is assumed that shaft 10 is rotated clockwise with reference to FIG. 1. In this case, ring 12 can rotate clockwise, at most as fast as shaft 10. Indeed, as long as ring 12 does not rotate as fast as shaft 10, it rotates, relative to shaft 10, in its free direction.

Figure 2:
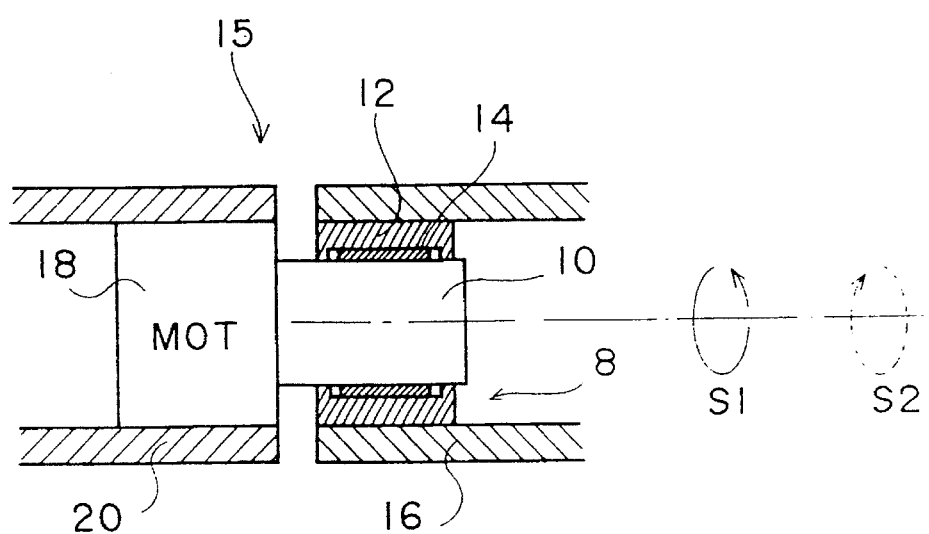
FIG. 2 represents an embodiment of a disengageable free wheel according to the present invention.

FIG. 2 represents an embodiment of a disengageable free wheel 15 according to the invention. Ring 12 of a free wheel 8 such as that of FIG. 1 is integral with a part 16. Ring 12 can be embedded or stopped in rotation and translation with respect to part 16 by conventional means. Shaft 10 of the free wheel is integral with the output shaft of a motor reducer 18. The body of the motor reducer 18 is integral with a second part 20. Thus, if the motor reducer 18 stands still, the situation is the same as in a conventional free wheel and part 16 can rotate relative to part 20 only in the free direction, as represented by a solid arrow S1. (It is assumed that the shaft of reducer 18 cannot be rotated by an external action).

In contrast, if shaft 10 is rotated in its free direction by reducer 18, part 16 can rotate relative to part 20 in its non-free direction, at most as fast as shaft 10, as represented by a dotted arrow S2. Of course, part 16 can still rotate in its free direction.

The above description shows that reducer 18 acts not only as a disengaging device but also as a speed limiter in the non-free direction of ring 12.

Figure 3:
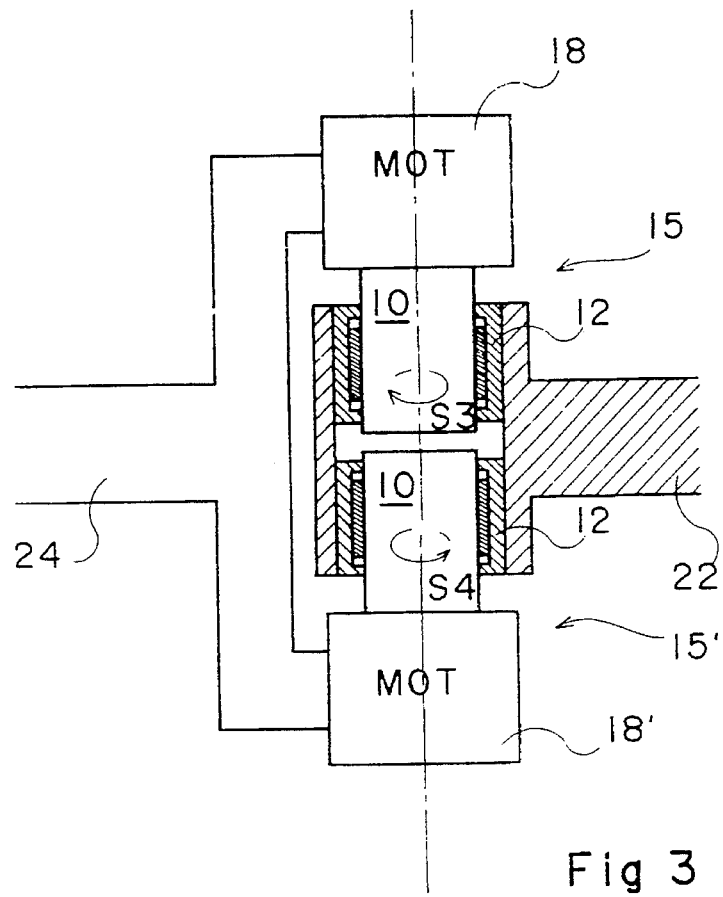
FIG. 3 illustrates an application of disengageable free wheels according to the present invention to a robot articulation.

FIG. 3 represents an application of two free wheels according to the invention to an articulation, for example of a robot arm. The rings 12 of the two free wheels 15 and 15', such as the one of FIG. 2, are integral with a first segment 22 of the robot's arm. The two free wheels 15 and 15' are coaxial and have opposite free directions, indicated by arrows S3 and S4. The shafts of the free wheels 15 and 15' are integral with the output shafts of two respective motor reducers 18 and The bodies of reducers 18 and 18' are integral with a same second segment 24 of the robot arm. Of course, reducers 18 and 18' are intended to drive their shafts in their respective free directions.

Thus, if the two reducers 18 and 18' stand still, segment 22 cannot rotate with respect to segment 24, since each rotation direction is blocked by one of the free wheels 15 and 15'. If one of reducers 18 and 18' is driven, segment 22 can rotate only in the direction of the shaft 10 that is rotated and at most as fast as this shaft 10. The free wheel, whose shaft 10 is not rotated, prevents segment 22 from rotating back.

Now, if the two reducers 18 and 18' are rotated, segment 22 can rotate in either direction, but at most as fast as the associated shaft 10.

A disengageable free wheel according to the invention, used in a system including position sensors, such as a robot arm, provides both progressive and accurate blocking. Indeed, if a segment of the robot arm approaches a limit position, which is detected by a position sensor, the associated motor reducer can be driven to progressively decrease its speed to zero as the segment approaches its limit position.

When this position is reached, the motor reducer is stopped and the segment remains blocked by the two free wheels that prevent the segment from rotating in any of its directions.

In the above description, it is assumed that the rotation speed of the motor reducer is independent of any external action on its output shafts 10.

For this purpose, a stepper motor, for example, can be provided for driving shaft 10 through a reduction gear having a sufficiently high ratio so that the torque transmissible to the motor through shaft 10 is lower than the remanent torque of the stepper motor.

Figures 4A, 4B:
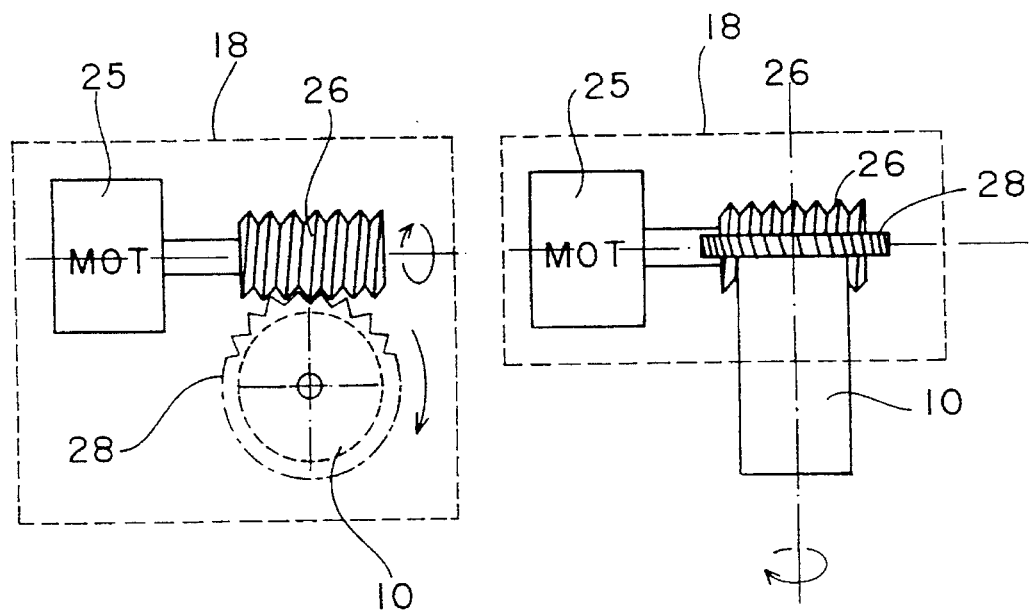
FIGS. 4A and 4B are two views of an irreversible gear usable in a free wheel according to the present invention.

FIGS. 4A and 4B are a top view and a side view, respectively, of a motor reducer 18 particularly adapted to a disengageable free wheel according to the invention. Reducer 18 includes a worm gear. A motor 25, of any conventional type, drives a screw 26. Screw 26 engages with a toothed wheel 28 having its axis perpendicular to the axis of the screw. The toothed wheel 28 is integral with the shaft 10 of a free wheel.

When the pitch of screw 26 is selected sufficiently small, the reduction gear becomes irreversible, that is, it is impossible to rotate motor 25 by acting on shaft 10, whatever the force applied to shaft 10.

When such a worm gear is used, the body of motor 25 is integral with a frame which also includes bearings for shaft 10 and screw 26.

As is apparent to those skilled in the art, various modifications can be made to the above disclosed preferred embodiments. For example, any conventional technical solution for mounting the elements can be used. The invention applies to any type of conventional free wheel and to any type of articulation, either rotational or translational.

Having thus described one particular embodiment of the invention, various alterations, modifications, and improvements will readily occur to those skilled in the art. Such alterations, modifications, and improvements are intended to be part of this disclosure, and are intended to be within the spirit and scope of the invention. Accordingly, the foregoing description is by way of example only and is not intended as limiting. The invention is limited only as defined in the following claims and the equivalents thereto.

I claim:

1. A disengageable free wheel including a first and a second part that can rotate only in a free direction, one relative to the other and a motor fixed to a body that can rotate relative to the second part, said motor being operative to rotate the first part only in its free direction such that the second part can rotate relative to the body in a direction opposite the free direction at most as fast as said first part.

2. The free wheel of claim 1, wherein the second part is a ring and the first part is a central shaft engaging with the ring through a ramp and roller system.

3. The free wheel of claim 1, wherein said first part is rotated by a worm gear.

4. An articulation including:

a first element bearing two motors operative to rotate two respective coaxial shafts in opposite directions; and first and second coaxial free wheels of opposite free rotation directions, each having a first part integral with a respective one of said two shafts and a second part integral with a common second element of the articulation.

5. The articulation of claim 4, wherein each second part is a ring and each first part is a shaft of the respective motor engaging with the ring through a ramp and roller system.

6. The articulation of claim 4, wherein each first part is rotated by a worm gear.

* * * * *